United States Patent [19]
Gasperino

[11] Patent Number: 5,769,437
[45] Date of Patent: Jun. 23, 1998

[54] HANDTRUCK HOLSTERS FOR DOOR STOPS AND CLIPBOARDS

[76] Inventor: Joseph A. Gasperino, 1620 Yates Dr., Merritt Island, Fla. 32952

[21] Appl. No.: 721,257

[22] Filed: Sep. 26, 1996

Related U.S. Application Data

[63] Continuation-in-part of Ser. No. 661,162, Jun. 10, 1996, abandoned.

[51] Int. Cl.⁶ ....................................................... B62B 1/00
[52] U.S. Cl. ................................... 280/47.27; 280/47.19; 292/343; 224/277
[58] Field of Search .................................... 292/343, 338, 292/339, DIG. 15; 280/47.27, 27.28, 27.19; 224/411, 277; 248/225.11

[56] References Cited

U.S. PATENT DOCUMENTS

| | | | |
|---|---|---|---|
| D. 221,131 | 7/1971 | Germock | D8/208 |
| D. 242,985 | 1/1977 | Sasgen | D8/203 |
| D. 309,708 | 8/1990 | Rosa et al. | D8/402 |
| D. 344,014 | 2/1994 | Marshall | D8/402 |
| 693,740 | 2/1902 | Raether . | |
| 1,181,056 | 4/1916 | Arnt . | |
| 1,354,046 | 9/1920 | Lanning | 292/343 |
| 1,730,676 | 10/1929 | Miller | 280/47.27 X |
| 2,577,579 | 12/1951 | Hall | 224/411 X |
| 3,079,168 | 2/1963 | Monroe et al. | 280/47.27 |
| 3,494,631 | 2/1970 | Goings | 224/277 |
| 3,804,432 | 4/1974 | Lehrman | 280/47.19 X |
| 4,501,444 | 2/1985 | Dominguez | 292/342 |
| 4,797,970 | 1/1989 | Charlton | 292/DIG. 15 X |
| 4,925,223 | 5/1990 | Craft | 292/339 |
| 4,954,869 | 9/1990 | Bisher | 292/339 |
| 4,976,479 | 12/1990 | Lunn . | |
| 5,123,666 | 6/1992 | Moore | 280/47.19 X |
| 5,244,221 | 9/1993 | Ward | 280/79.7 |
| 5,415,420 | 5/1995 | Koeller | 280/47.28 |
| 5,447,347 | 9/1995 | Siddons | 292/DIG. 15 X |
| 5,465,987 | 11/1995 | Della Vecchia | 280/47.28 |

FOREIGN PATENT DOCUMENTS

| | | | |
|---|---|---|---|
| 163 530 | 5/1921 | United Kingdom | 292/343 |

*Primary Examiner*—Rodney M. Lindsey
*Attorney, Agent, or Firm*—Brian S. Steinberger; Law Offices of Brian S. Steinberger

[57] ABSTRACT

A portable collapsible door stop and holsters for supporting door stops and for attaching the holsters to hand trucks. The preferred embodiment of the door stop includes two main rectangular plates hingedly attached to one another at one end. Third and fourth plates hingedly attach beneath one of the rectangular plates having their opposite ends which are received in recessed grooves in the upper surface of the other main rectangular plate. The collapsible door stop has a side mounted clip for holding the door stop in a shirt pocket. The holsters include open topped boxes wherein the angled portion of wedge shaped door stop are inserted therein. Hinges formed from coiled springs or bent metal strips compress and fixably hold the door stops inside of the box. Expandable side clips allow for the holsters to be attached to the legs and bars of a hand truck or dolly. The boxes can be sized to allow plural door stops to be positioned therein. The collapsible door stop and the holsters can be formed from aluminum. Alternative embodiments include building the holster into the existing hollow side frame leg of a handtruck by attaching a pin or plate across the interior opening of the side frame leg. Alternative embodiments further include using the holsters to support clipboards on the cross-brace bars of the handtrucks.

7 Claims, 21 Drawing Sheets

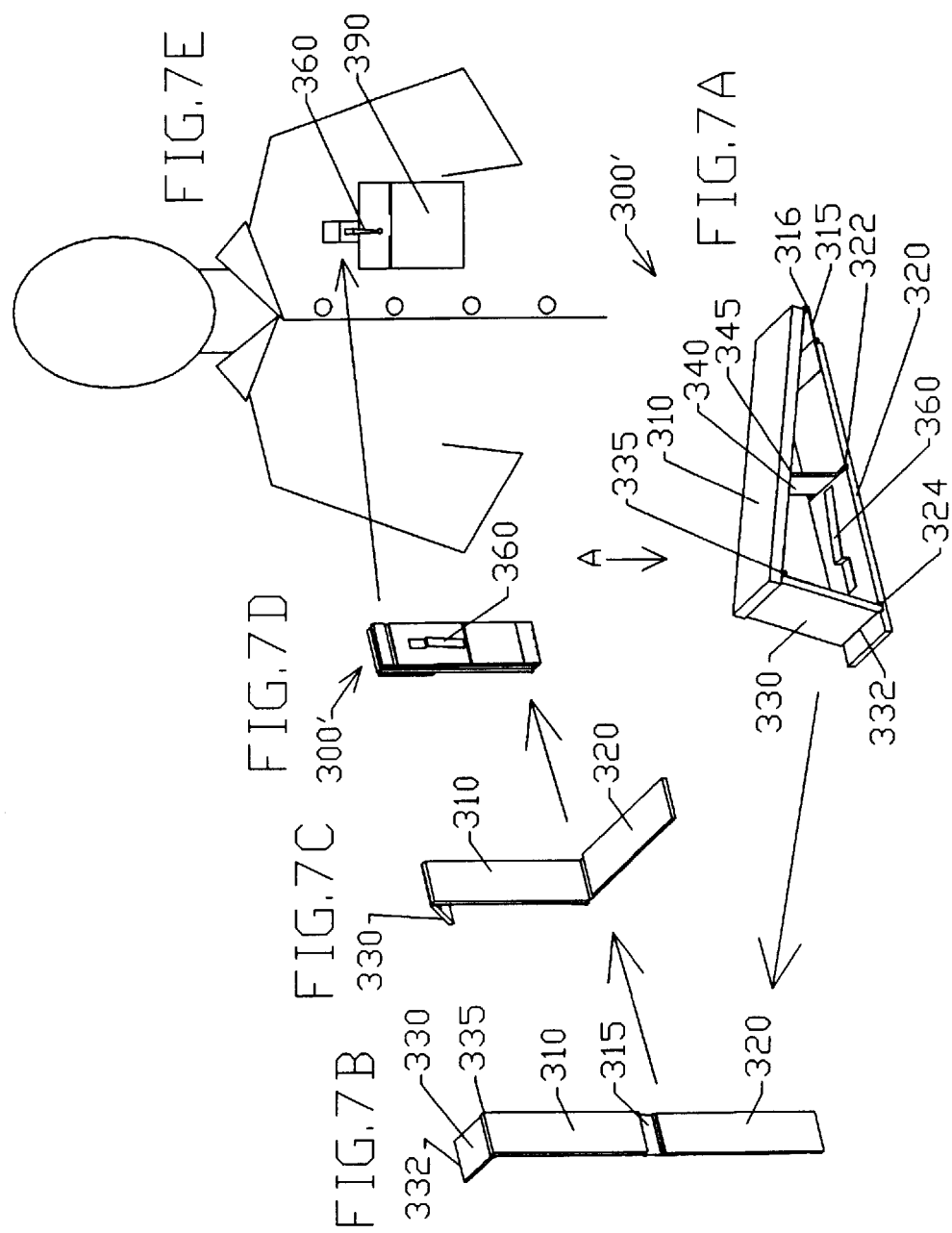

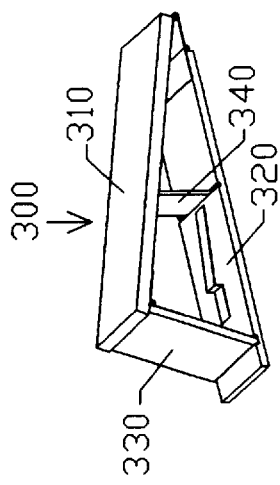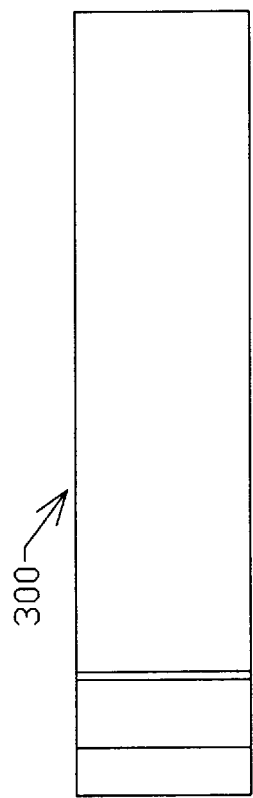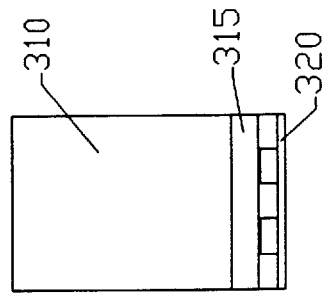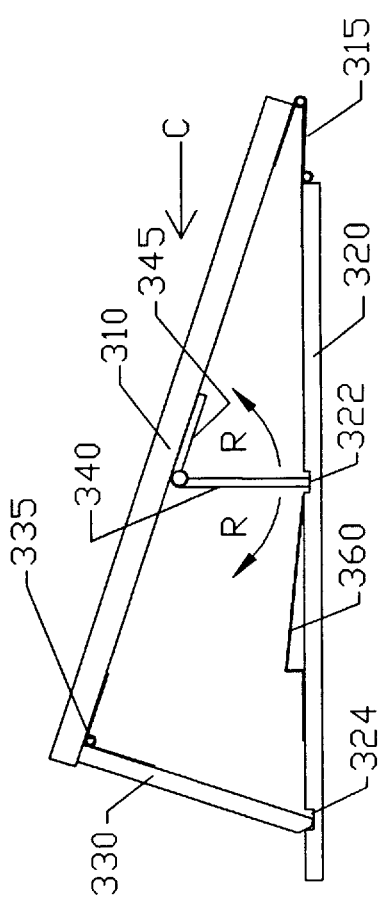

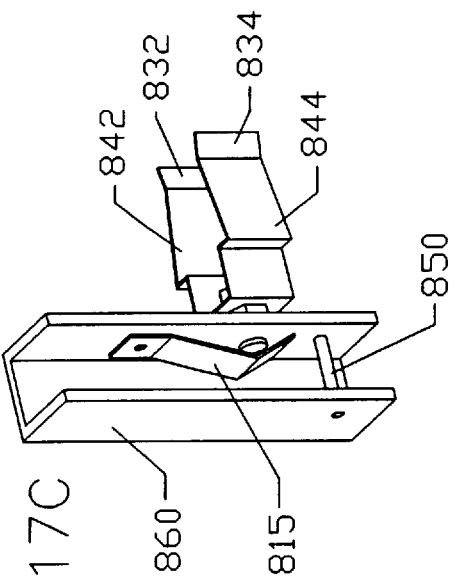
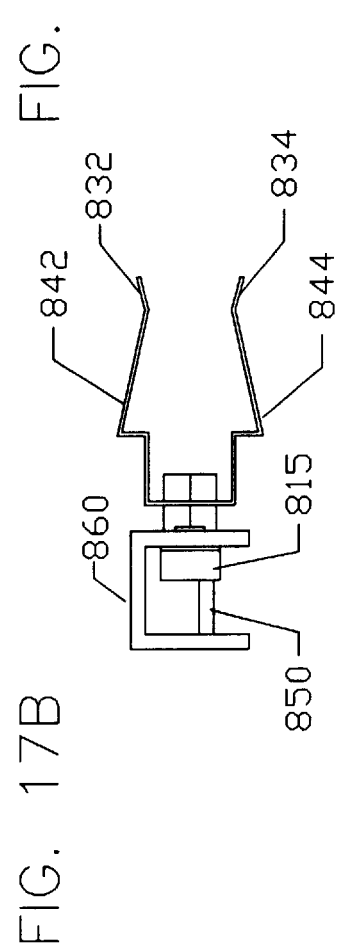
FIG. 17C
FIG. 17B

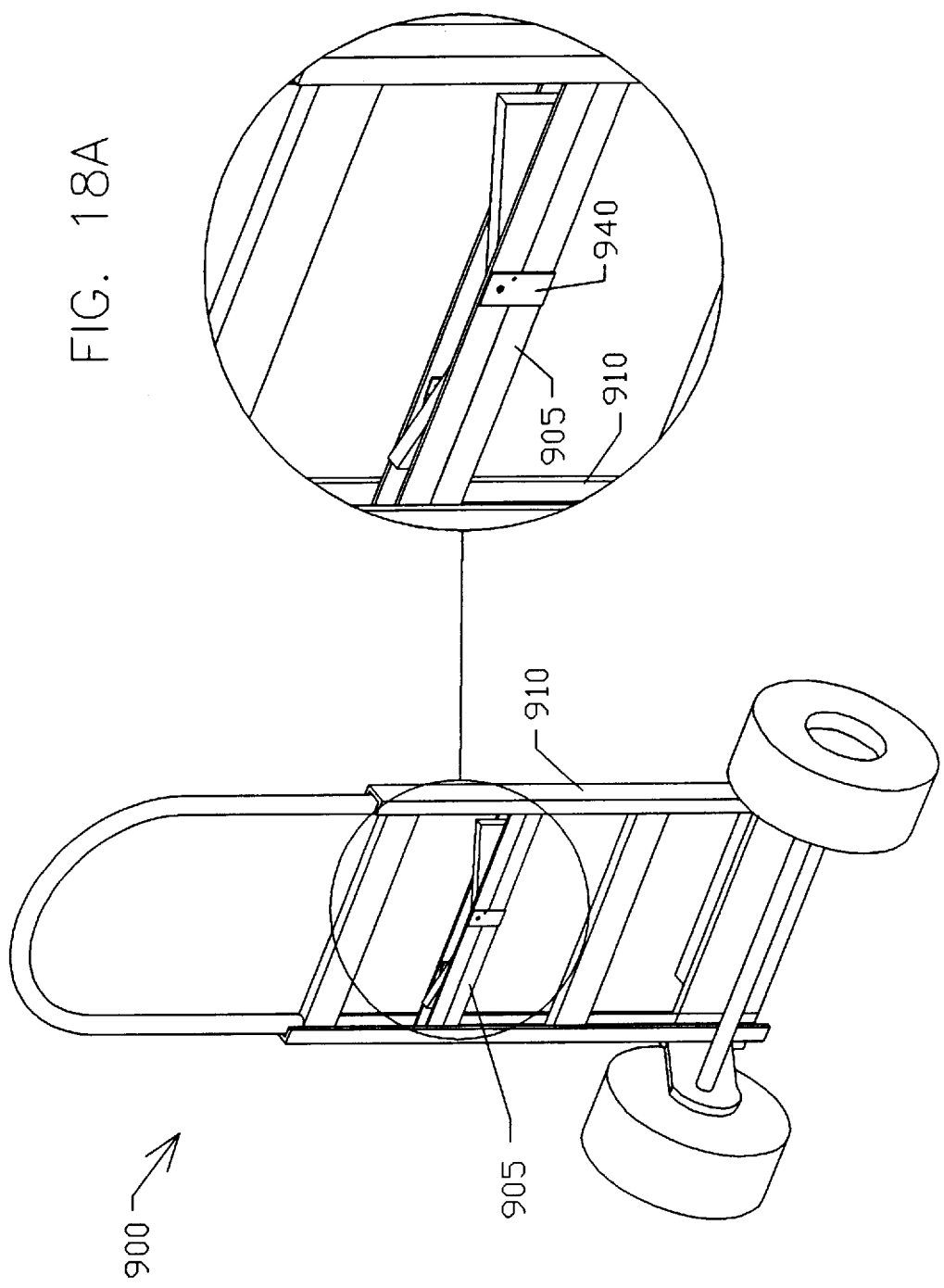

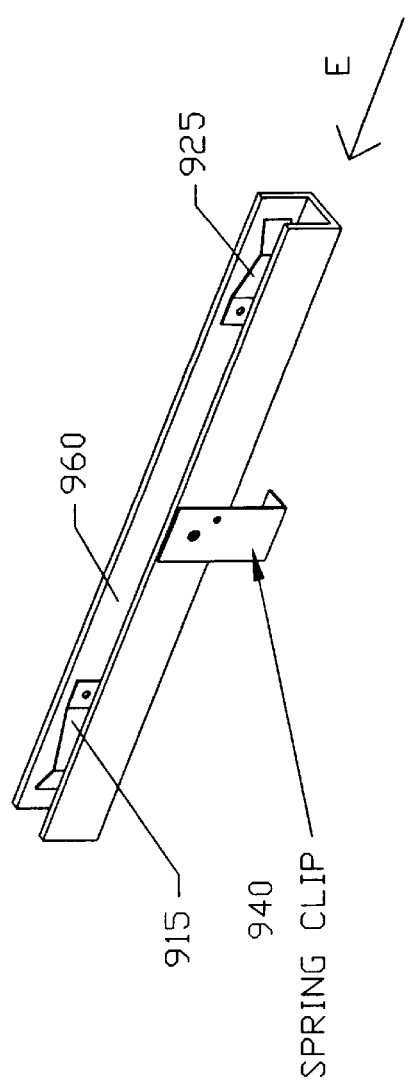
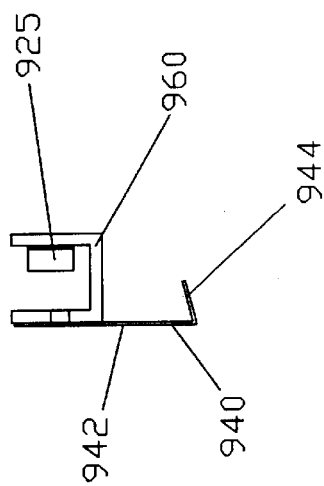
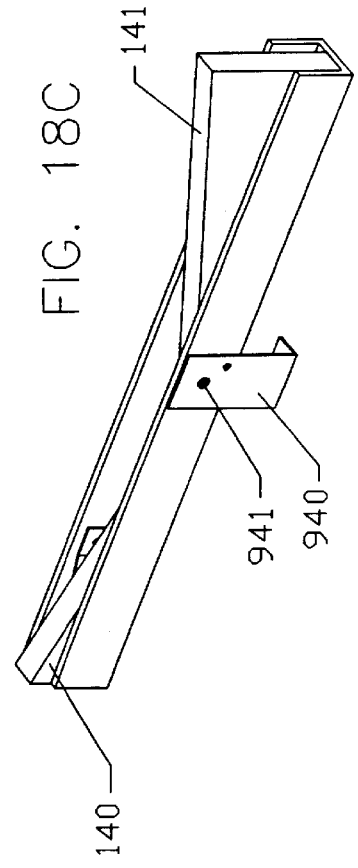

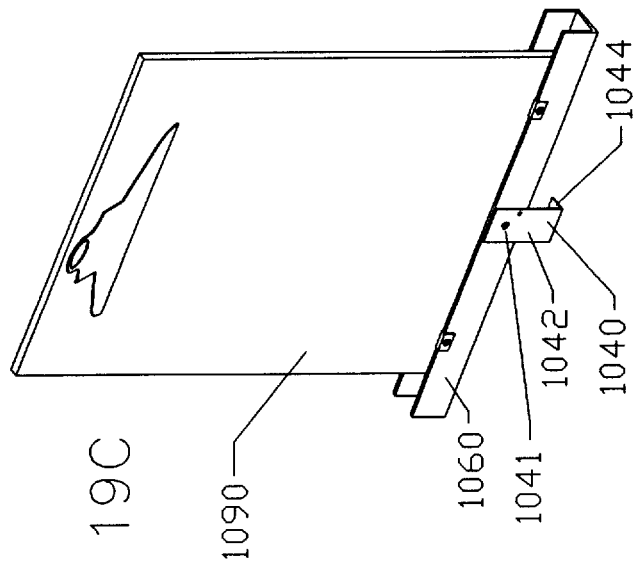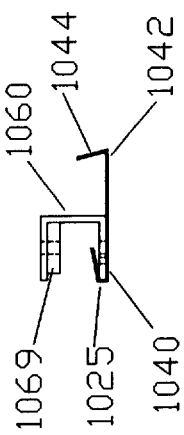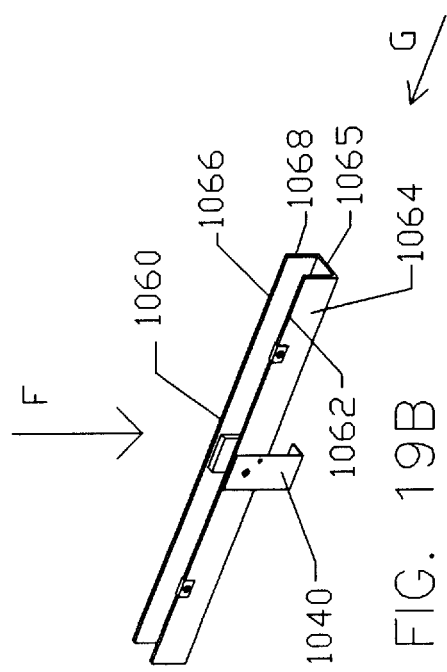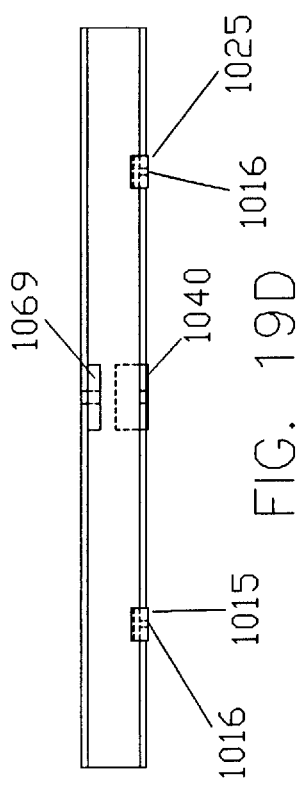

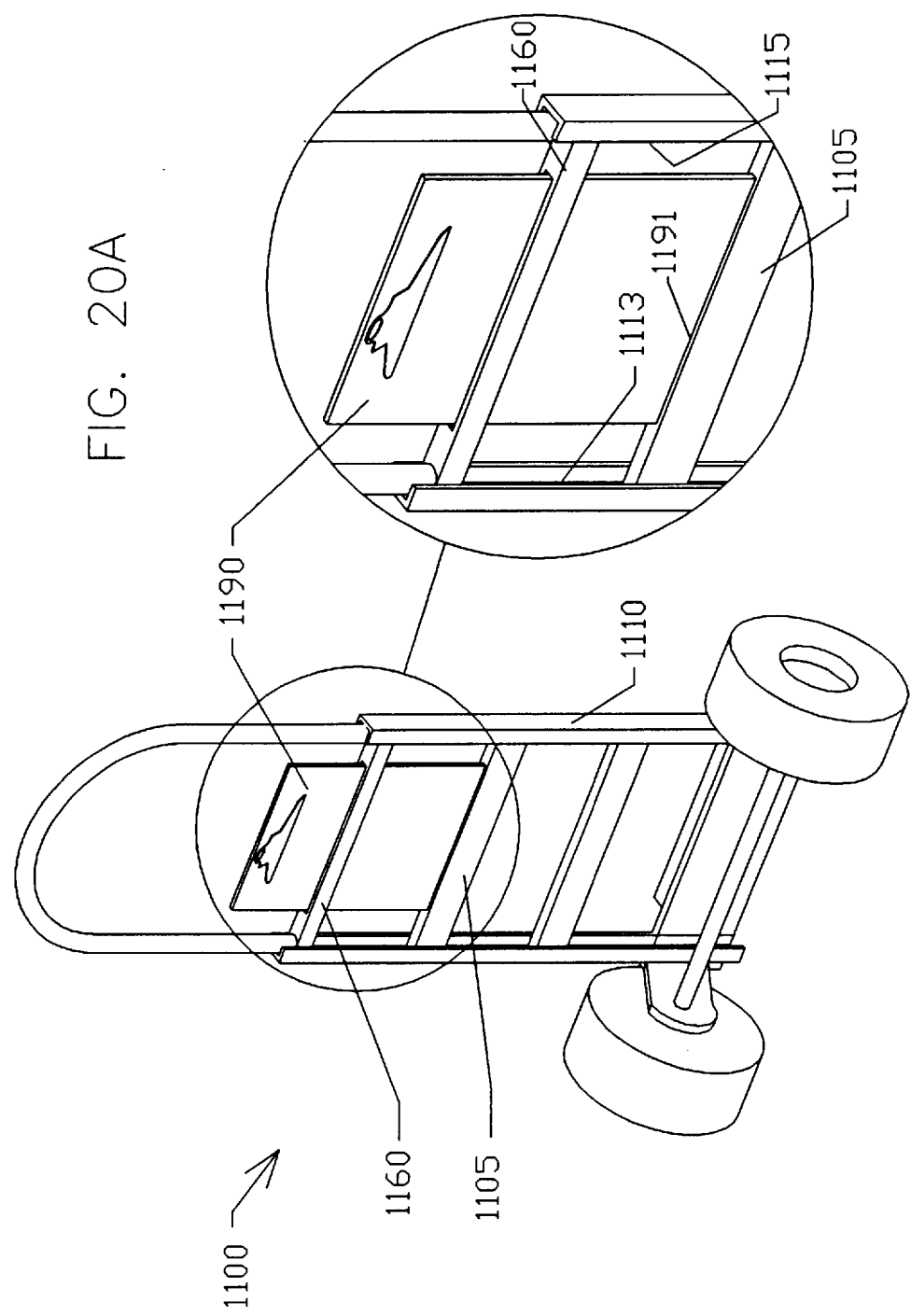

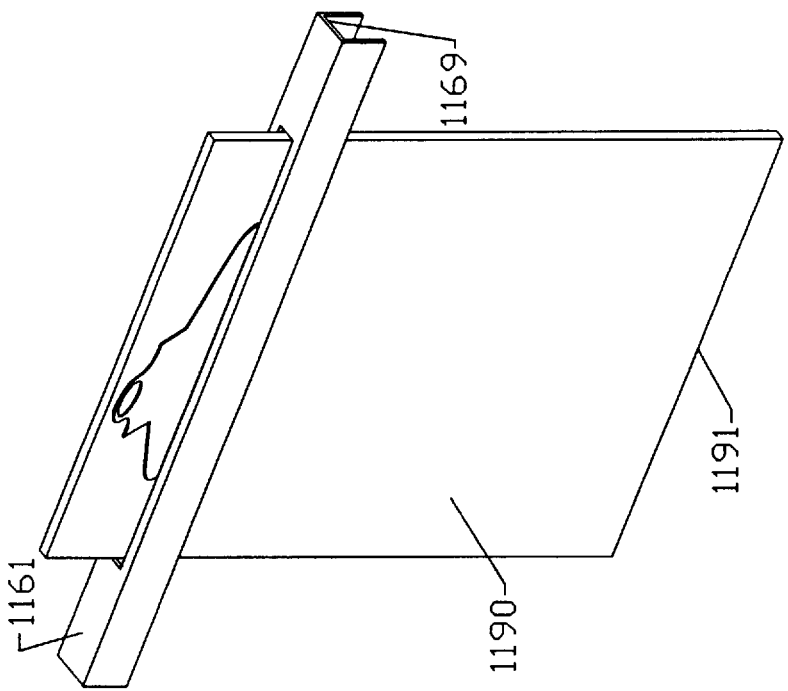
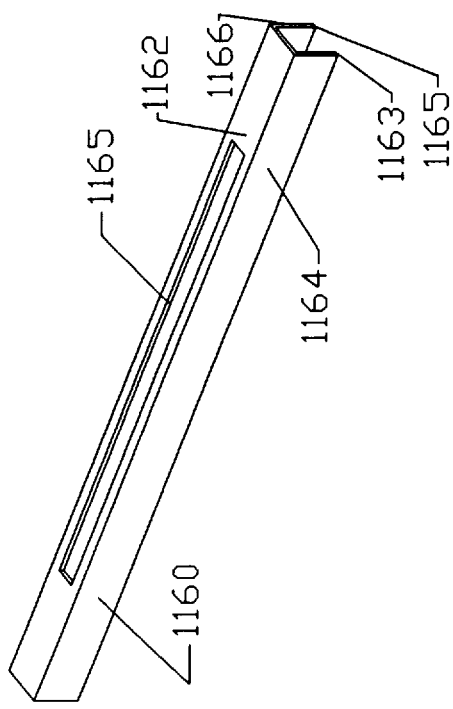

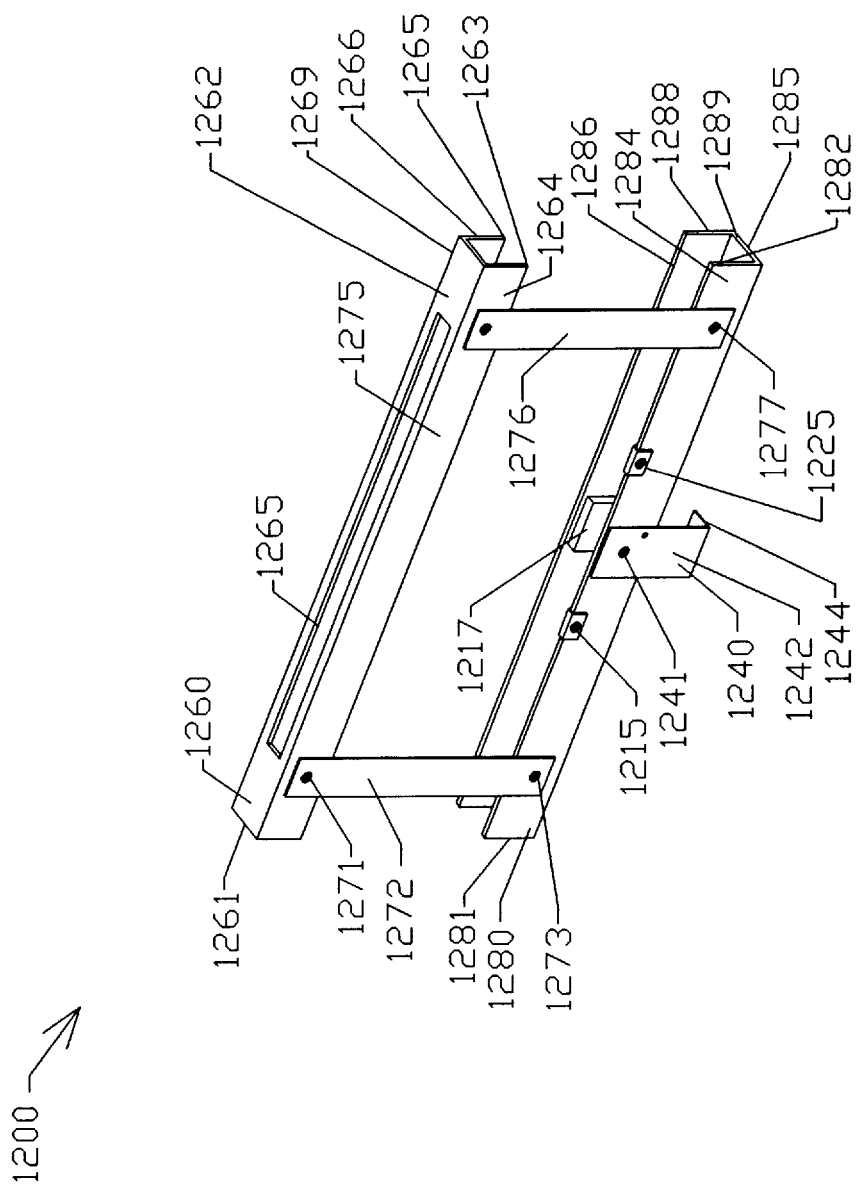

HANDTRUCK HOLSTERS FOR DOOR STOPS AND CLIPBOARDS

This invention relates to door stops and clipboards, and in particular to a collapsible door stop and holsters for door stops and clipboards to hand trucks. This application is a Continuation-In-Part of U.S. application Ser. No. 08/661,162 filed on Jun. 10, 1996 now abandoned.

BACKGROUND AND PRIOR ART

Servicemen and delivery men, such as truck drivers, often have the need for propping open doors when making service calls and for making deliveries. The propping open of doors is further exacerbated when the doors are spring loaded. Traditional devices for propping open doors have been wedges usually formed from wood or rubber. See for example: U.S. Pat. No. Des. 309,708 to Rosa et al.

Variations on the shape of wedge shaped door stops have been proposed. See U.S. Pat. Nos. Des. 221,131 to Germock, Jr.; Des. 242,985 to Sasgen; Des. 344,014 to Marshall; 693,740 to Raether; 1,181,056 to Arnt; 4,958,869 to Bisher; and 4,976,479 to Lunn. However, these alternatives include bent wire shapes, oblong and strange configurations that can be both difficult and expensive to manufacture. Furthermore, many of these alternative door stops have sharp edges/ends that could damage floors and not be carried by the user.

Servicemen also have a need for carrying clipboards when making deliveries. It becomes cumbersome and difficult to hand carry the clipboard while the servicemen is simultaneously using a handtruck.

SUMMARY OF THE INVENTION

The first objective of the present invention is to provide a portable foldable door stop.

The second objective of the present invention is to provide a portable collapsible door stop that can easily and safely be carried in a user's pockets.

The third object of this invention is to provide a holster for storing a single door stop that can be attached to a hand truck.

The third object of this invention is to provide holsters for storing plural door stops that can be attached to hand trucks.

The fourth object of this invention is to provide a door stop for doors that open immediately onto handicap ramps or sloped ramps.

The fifth object of this invention is to provide clipboard holsters that can be attached to handtrucks.

Further objects and advantages of this invention will be apparent from the following detailed description of a presently preferred embodiment which is illustrated schematically in the accompanying drawings.

BRIEF DESCRIPTION OF THE FIGURES

FIG. 7A is a perspective view of the collapsible door stop in an expanded working position.

FIG. 7B is a perspective view of the door stop of FIG. 7A in a first unfolded position.

FIG. 7C is a perspective view of the door stop of FIG. 7A in a second unfolded position.

FIG. 7D is a perspective view of the door stop of FIG. 7A in a final folded position.

FIG. 7E is a perspective view of the door stop of FIG. 7C in a shirt pocket.

FIG. 9 is a top view of the collapsible door stop 300 of FIG. 7A along arrow A.

FIG. 10 is a perspective view of the collapsible door stop 300 of FIG. 9 and 7A.

FIG. 11 is a side view of the door stop of FIG. 9 along arrow B.

FIG. 12 is an end view of the door stop of FIG. 100 along arrow C.

FIG. 17B is a top view of the holster of FIG. 17A without a door stop not attached to a handtruck.

FIG. 17C is a separate perspective view of the holster of FIG. 17B.

FIG. 18A is a perspective view of another dual door stop holster embodiment snap attachable to a cross-bar of a handtruck.

FIG. 18B is a view of the dual door stop holster of FIG. 18A not attached to handtruck.

FIG. 18C is a view of the door stop holster of FIG. 18B with two door stops inside the holster.

FIG. 18D is a side view of the dual door stop holster of FIG. 18B along arrow E.

FIG. 19B shows the clipboard holster of FIG. 19A without a clipboard unattached to a handtruck.

FIG. 19C shows the clipboard holster of FIG. 19B with a clipboard.

FIG. 19D is a top view of the clipboard holster of FIG. 19B along arrow F.

FIG. 19E is a side view of the clipboard holster of FIG. 19B along arrow G.

FIG. 20A is a perspective view of another clipboard holster attachment for a handtruck.

FIG. 20B is a view of the clipboard holster of FIG. 20A without a clipboard and handtruck.

FIG. 20C is a view of the clipboard holster of FIG. 20B with a clipboard.

FIG. 21A is a perspective view of another clipboard holster for a handtruck.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
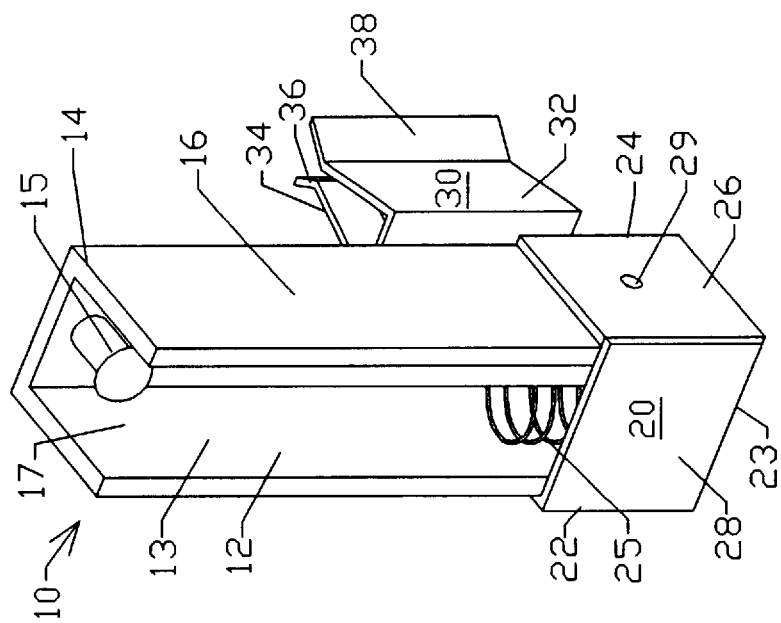
FIG. 1 is a perspective view of a first preferred embodiment of the novel holster invention.

FIG. 1 is a perspective view of a preferred embodiment 10 of the novel holster invention.

Figure 2:
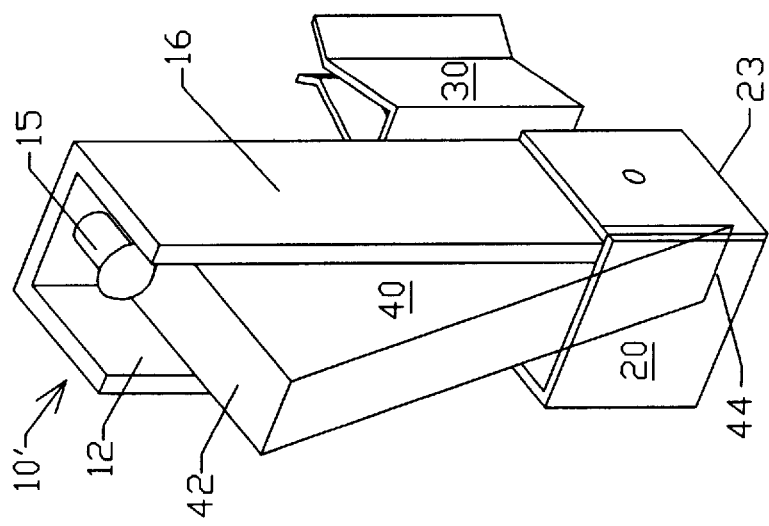
FIG. 2 is a view of FIG. 1 with a door stop inserted therein.

FIG. 2 is a perspective view of the invention 10' of FIG. 1 with a door stop 40 inserted therein.

Referring to FIGS. 1–2, holster 10 includes a square box base 20 having left side 22, rear side 24, right side 26, front side 28, bottom side 23 with a spring 25 inside therein. On top of base 20 are rectangular side plates 12, 16 and back rectangular plate 14 having a stopper plug 15 attached to an upper portion. Attached to back rectangular plate 14 is a bendable clip 30 having outer expanding edges 36, 38 and interior sides 32, 34 which can wrap about the side bars/legs of a hand truck shown in better detail in FIGS. 13–15. The components of embodiment 10 can be formed from aluminum, and be welded together at their respective edges and with additional inserted metallic fasteners 29. A door stop 40 such as known prior art triangular wedge formed from wood, plastic and the like, is positioned into the embodiment 10' through the top opening 17 and front opening 13. Inside the embodiment 10, the sharpened triangular tip portion 44 inside the box base 20 with an edge of the base end 42 abutting against the stopper plug 15.

Figure 4:
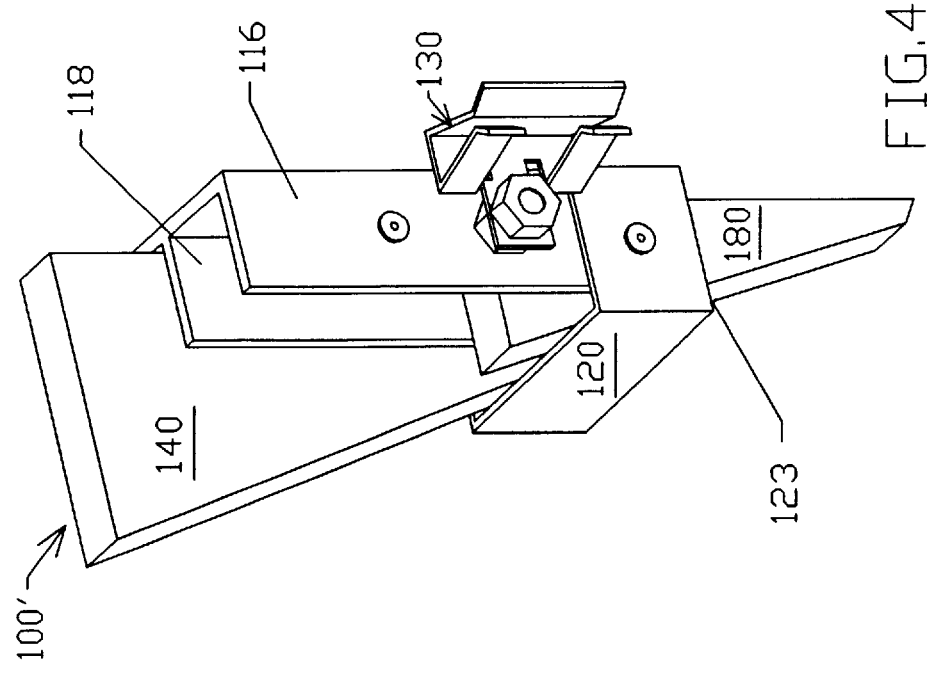
FIG. 4 is a view of FIG. 3 with two door stops inserted therein.
Figure 3:
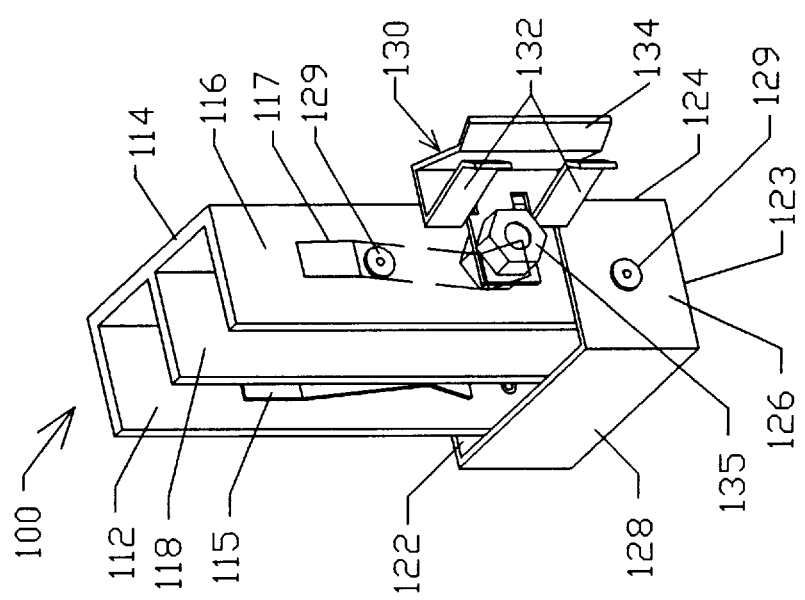
FIG. 3 is a perspective view of a second preferred embodiment of the novel holster invention.

FIG. 3 is a perspective view of a second preferred embodiment 100 of the novel holster invention. FIG. 4 is a perspective view 100' of FIG. 3 with two door stops 140, 180 inserted therein. Referring to FIGS. 3–4, holster 100 includes a square box base 120 having left side 122, rear side 124, right side 126, front side 128, and open bottom 123. On top of base 120 are rectangular side plates 112, 116, center plate 118 and back rectangular plate 114 having bendable bent metal tabs 115, 117 attached to interior side walls which bend inward when triangular door stop wedges 140, 180 are inserted inside. Spring like tabs 115, 117 abut against the sides of door stop wedges 140, 180 holding them inside. Attached by a bolt and screw 135 to the exterior surface of side plate 116 is a bendable clip 130 having outer expanding prongs 132, 134 which can wrap about the side bars/legs of a hand truck shown in better detail in FIGS. 13–15. The components of embodiment 100 can be formed from aluminum, and be welded together at their respective edges and with additional inserted metallic fasteners 129. Door stops 140, 180 such as known prior art triangular wedge formed from wood, plastic and the like, is positioned into slot areas formed by rectangular plates 112, 114, 116 of embodiment 100'.

Figure 6:
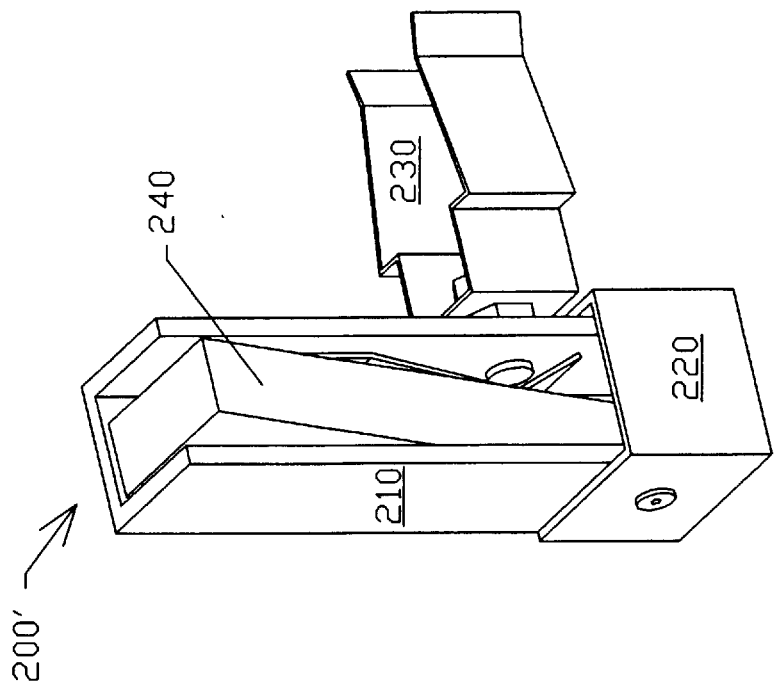
FIG. 6 is a view of FIG. 5 with a door stop inserted therein.
Figure 5:
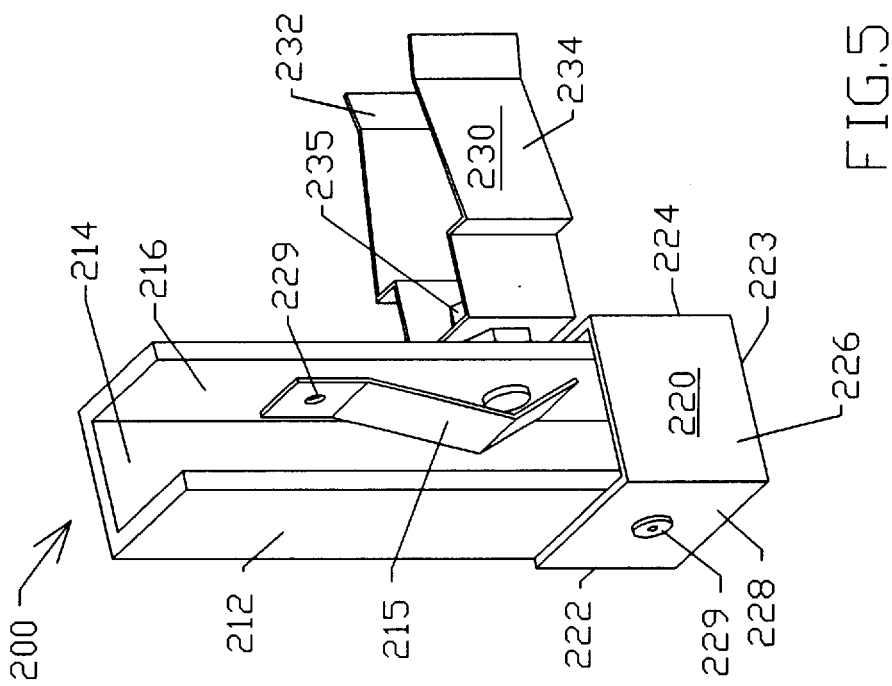
FIG. 5 is a perspective view of a third preferred embodiment of the novel holster invention.

FIG. 5 is a perspective view of a third preferred embodiment 200 of the novel holster invention. FIG. 6 is a view 200' of FIG. 5 with a door stop 240 inserted therein.

Referring to FIGS. 5–6, holster 200 includes a square box base 220 having left side 222, rear side 224, right side 226, front side 228, bottom side 223. On top of base 220 are rectangular side plates 212, 216 and back rectangular plate 214 having a bendable bent metal tab 215 attached to interior side walls which bend inward when triangular door stop wedge 240 is inserted inside. Spring like tab 215 abuts against the sides of door stop wedge 240 holding wedge inside. Attached by a bolt and screw 235 to the exterior surface of side plate 216 is a bendable clip 30 having outer expanding prongs 232, 234 which can wrap about the side bars/legs of a hand truck shown in better detail in FIGS. 13–15. The components of embodiment 200 can be formed from aluminum, and be welded together at their respective edges and with additional inserted metallic fasteners 229. A door stop 240 such as known prior art triangular wedge formed from wood, plastic and the like, is positioned into the embodiment 200 through the top opening 17 and front opening 13.

FIG. 7A is a perspective view of the collapsible door stop 300 in a working position. FIG. 7B is a perspective view of the door stop 300 of FIG. 7A in a first unfolded position. FIG. 7C is a perspective view of the door stop 300' of FIG. 7A in a second unfolded position. FIG. 7D is a perspective view of the door stop 300' in a final folded position. FIG. 7E is a perspective view of the door stop 300' of FIG. 7C in a shirt pocket. Referring to FIGS. 7A–7E, novel door stop 300 includes first rectangular plate member 310 having one end attached by a multileaf hinge 315 (foldable at 314, 316) to a matching second rectangular plate member 320. The front lower end of plate member 310 is hingedly attached at 335 to a smaller third rectangular plate member 330. Free swinging end 322 of third plate member 330 fits inside recessed groove 324 located on the upper surface of plate 320. A fourth smaller plate member 340 is hingedly attached at 345 beneath a mid area of plate 310, and also includes a free swinging end which can fit into a grooved recess located on an upper mid area of plate 320. A pen clip metal strip 360 attached at one end to plate 320 allows for the folded door stop 300' of FIG. 7C to be stored by a user in their pocket 390 shown in FIG. 7D.

Figure 8:
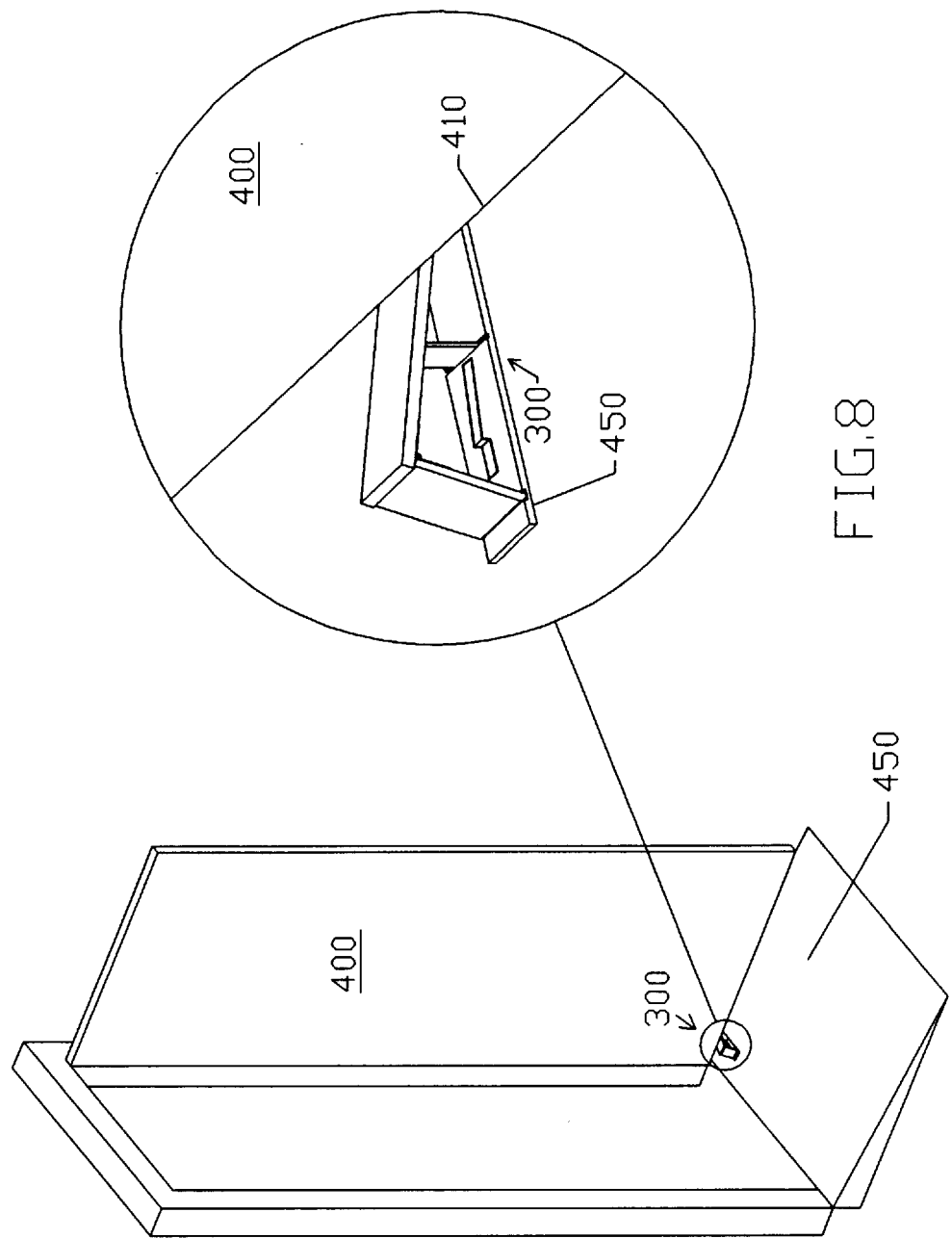
FIG. 8 is a perspective view of the expanded door stop of FIG. 7A in operation with a handicapped access way.

FIG. 8 is a perspective view of the expanded door stop 300 of FIG. 7A in operation positioned between a handicap access (slanted) floor 450 and the bottom edge 410 of a door 400 being held open.

FIG. 9 is a top view of the collapsible door stop 300 of FIG. 7A along arrow A. FIG. 10 is a perspective view of the collapsible door stop 300 of FIG. 9 and 7A. FIG. 11 is a side view of the door stop of FIG. 9 along arrow B showing smaller plate 340 rotatable in the direction of arrow R. FIG. 12 is an end view of the door stop of FIG. 100 along arrow C. The components forming the door stop 300 of FIGS. 9–12 are described in detail in reference to FIGS. 7A–7D.

Figure 13:
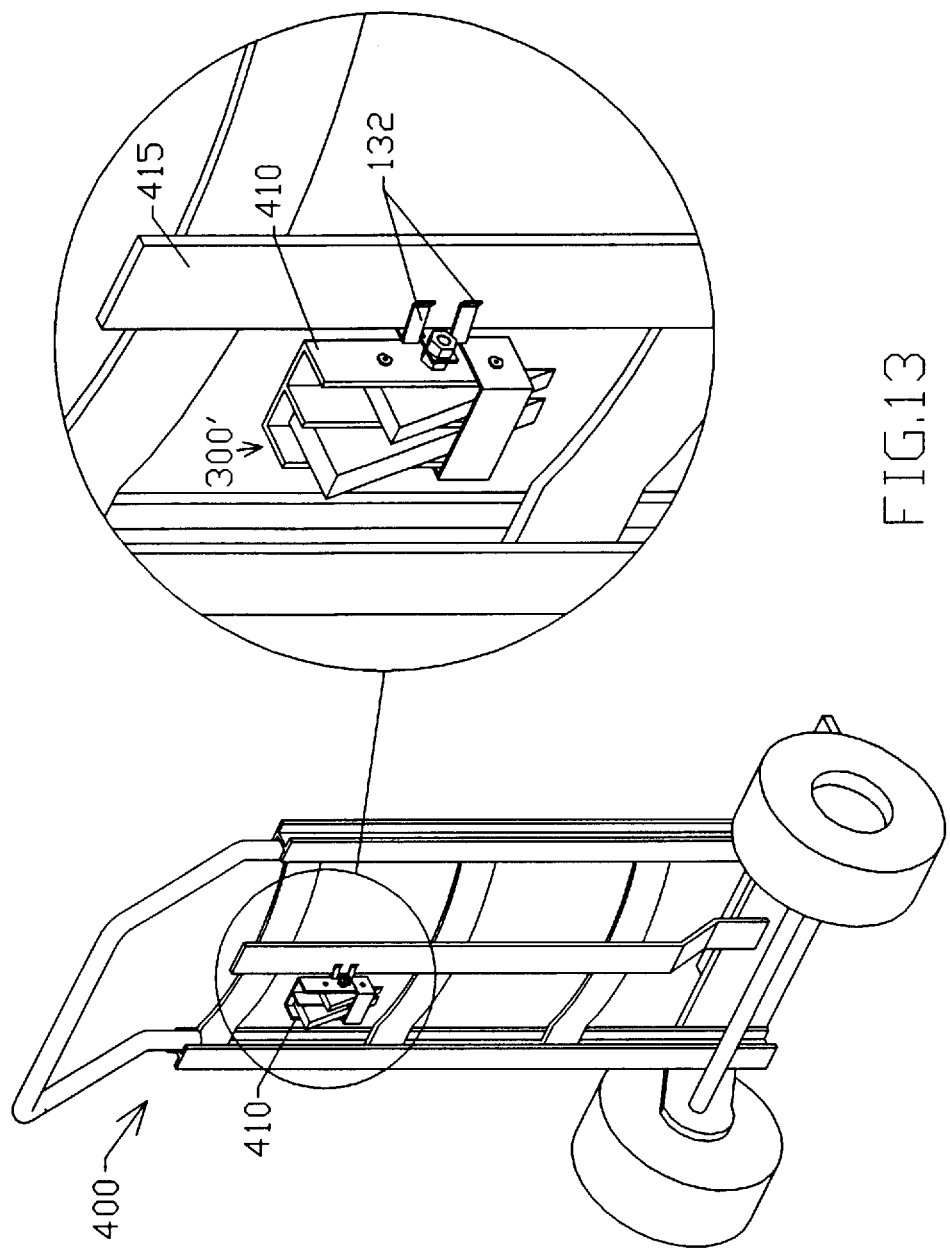
FIG. 13 is a perspective view of the double holster of FIG. 4 attached to a hand truck.
Figure 14:
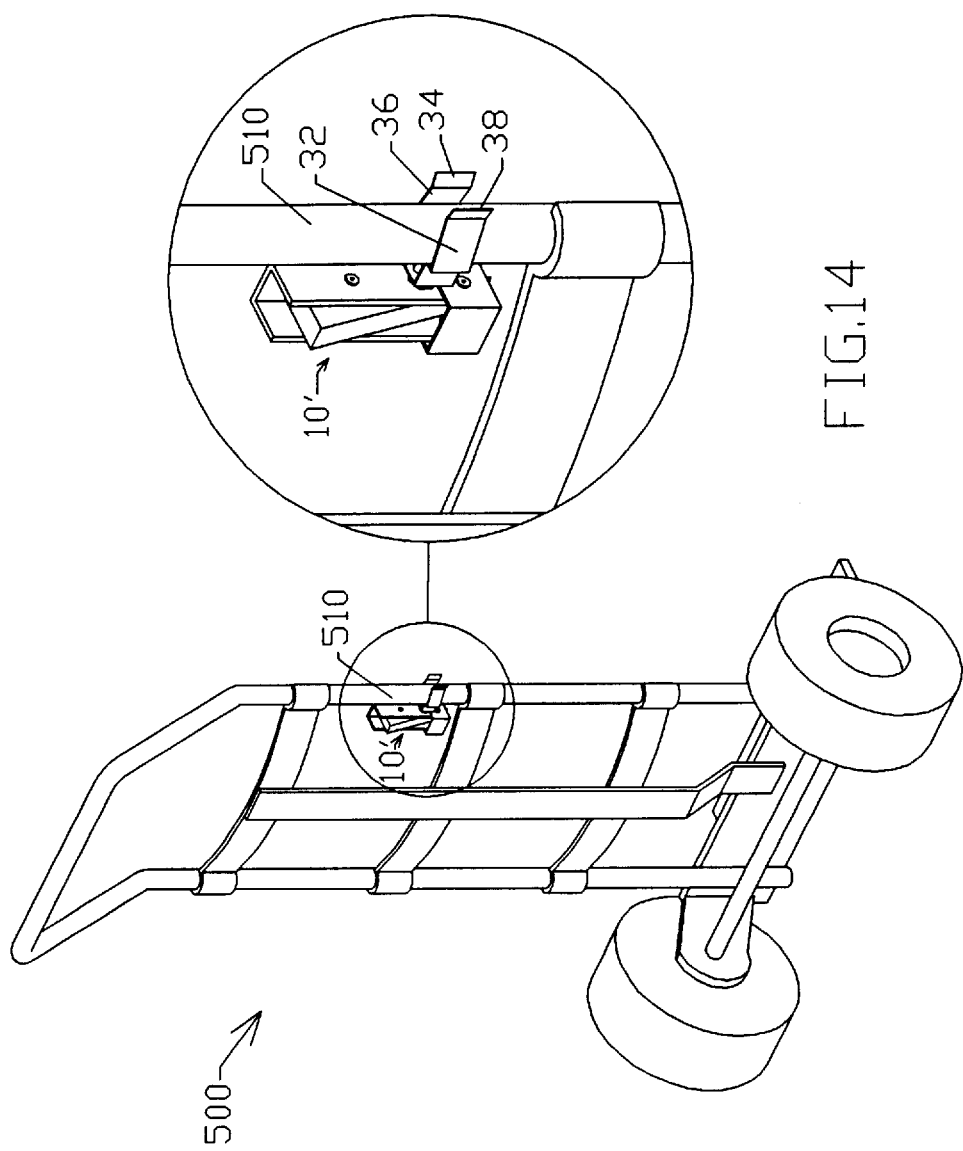
FIG. 14 is a perspective view of the single door stop holster of FIG. 2 attached by expandable clip members to the longitudinal bar-leg of a hand truck.
Figure 15:
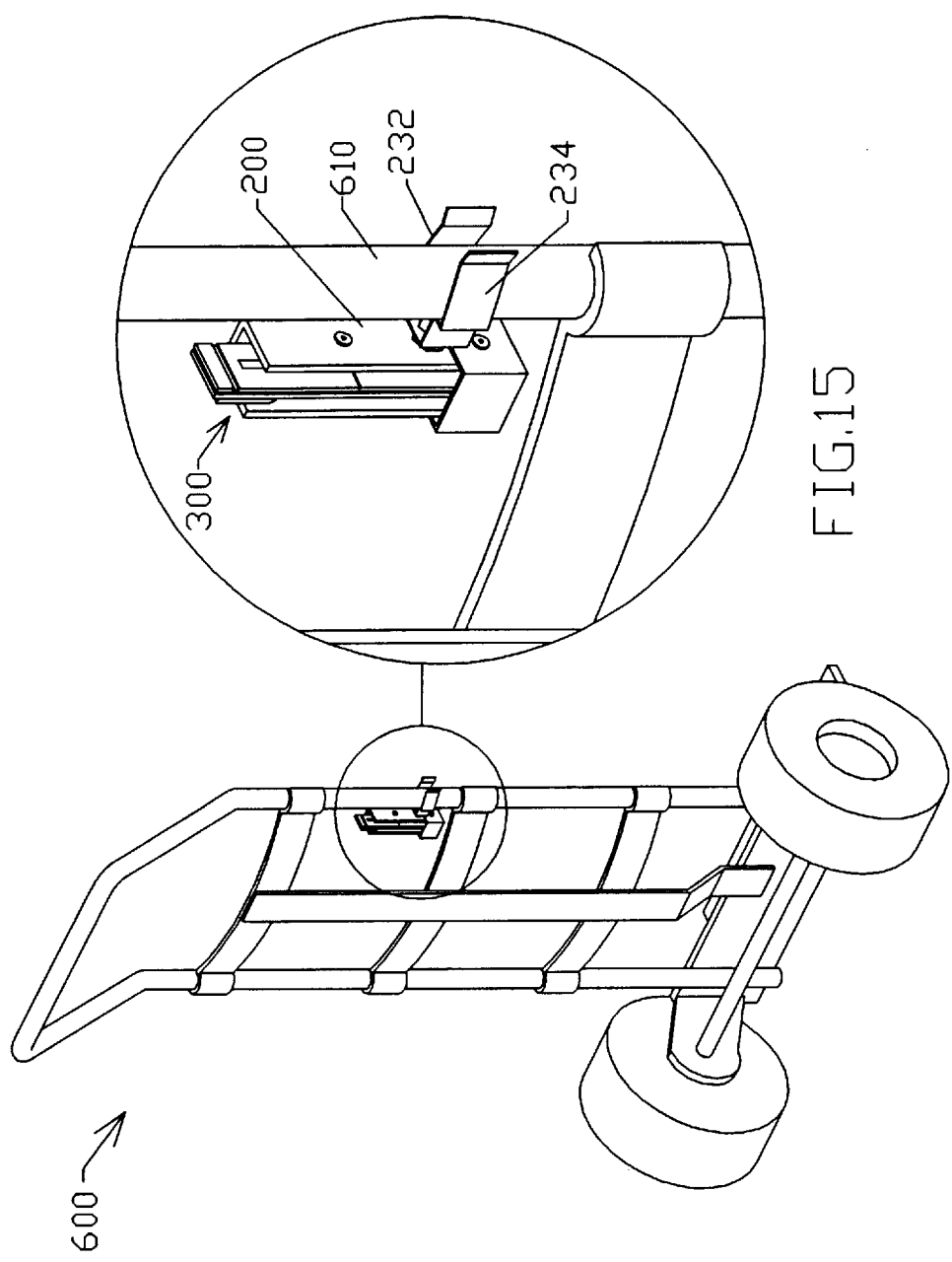
FIG. 15 is a perspective view of the holster of FIG. 5 holding the novel door stop of FIGS. 7A, 9–12 by expandable clips to the bar-leg of a hand truck.

FIG. 13 is a perspective view of the double holster 100' of FIG. 4 attached to a hand truck. Expandable prongs 132 of the holster clip 130 wrap about the edge 415 of a longitudinal leg 410 of a hand truck 400. FIG. 14 is a perspective view of the single door stop holster 10' of FIG. 2 attached by expandable clip members 32, 38 and 36, 34 wrapping about a longitudinal bar-leg 510 of a hand truck 500. FIG. 15 is a perspective view of the holster 200 of FIG. 5 holding the novel door stop of FIGS. 7A, 9–12 by expandable clip 232, 234 wrapping about a bar-leg 610 of at hand truck 600.

Figure 16:
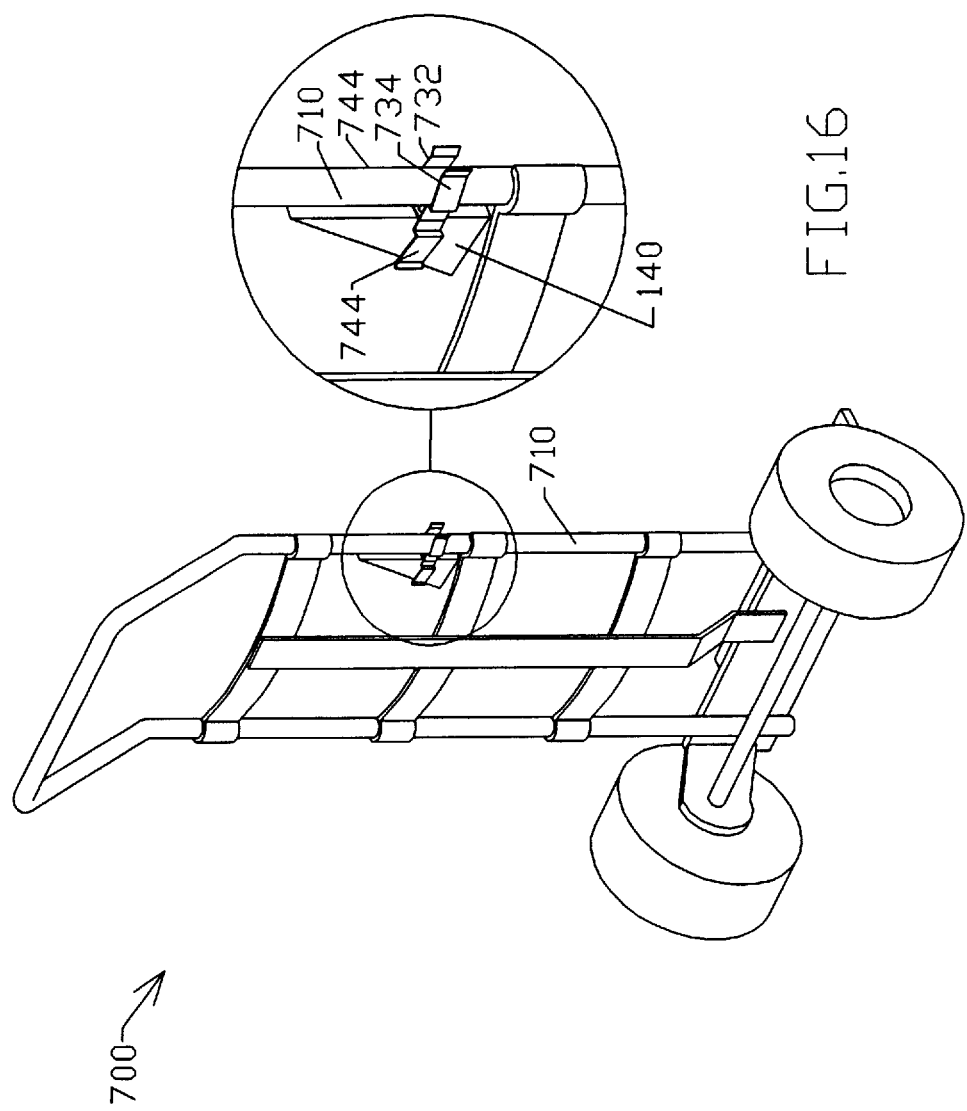
FIG. 16 is a perspective view of another novel doorstop holster.

FIG. 16 is a perspective view 700 of another door stop holster having dual opposing expandable clip sections 732, 734 and 742, 744. Center piece 745 holds clip sections 732,

734 and 742, 744 back-to-back. Clip portion 732, 734 wrap about leg/bar 710 of the hand truck and clip portions 742, 744 clip about a triangular door stop 140 which has been previously described.

Figure 17A:
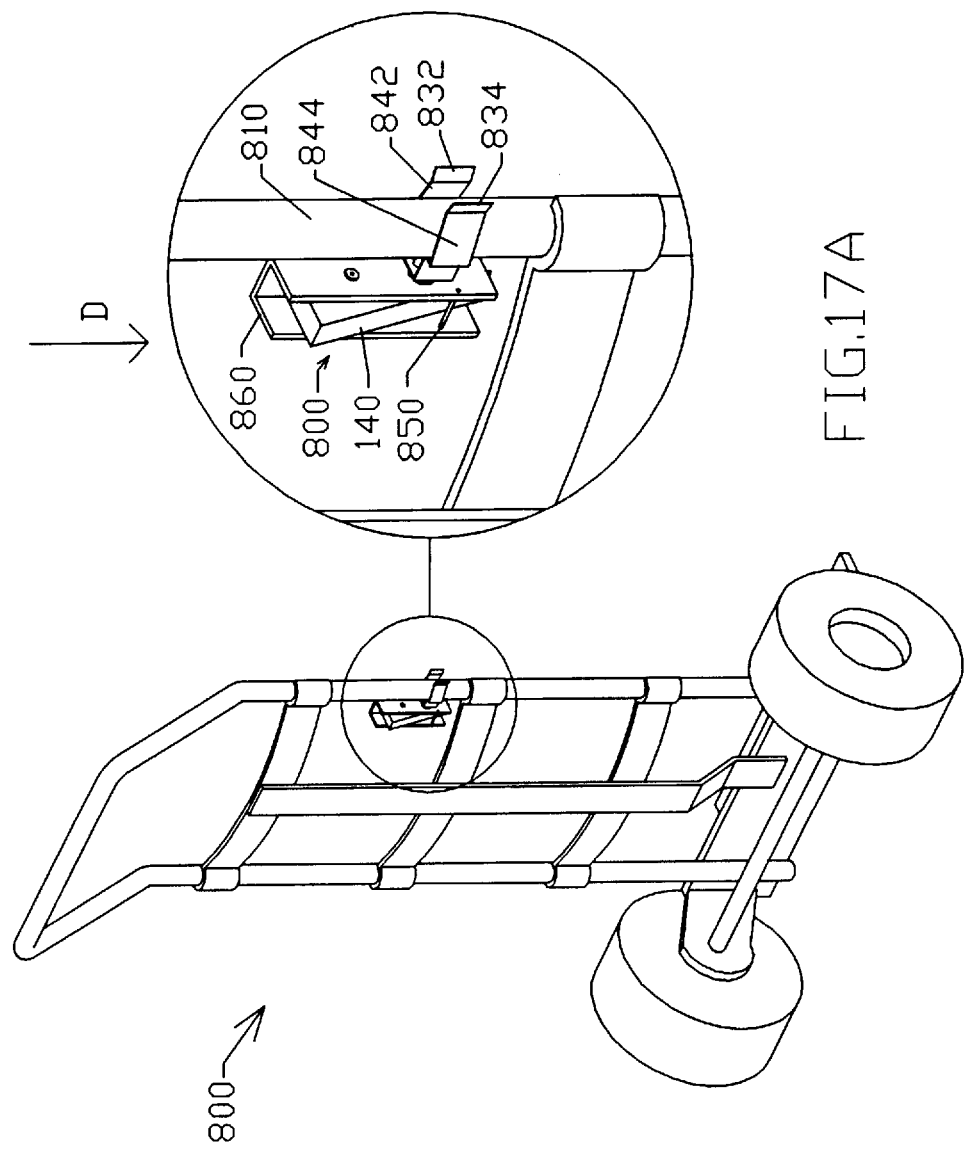
FIG. 17A is a perspective view of another single door stop holster embodiment of FIGS. 1, 2, 14, using a pin instead of a front sidewall, that is attached to a handtruck.

FIG. 17A is a perspective view of another embodiment 800 of the single door stop holster of FIGS. 1, 2, 14, using a pin 850 instead of a front sidewall, that is attached to a handtruck leg/bar 810. FIG. 17B is a top view of the holster embodiment 800 of FIG. 17 A without a door stop not attached to a handtruck. FIG. 17C is a separate perspective view of the holster embodiment 800 of FIG. 17B. Referring to FIGS. 17A–17C, holster embodiment 800 includes dual opposing expandable clip sections 832, 834 and 842, 844 that supports rectangular casing 860 having an open top, open bottom and open front with a pin 850 across a lower portion for holding door stop 140 therein. An interior attached bent metal tab 815 similar to those described previously functions as a compressible spring to hold the door stop 140 inside the box 860.

FIG. 18A is a perspective view of another dual door stop holster embodiment 900 snap attachable and detachable to a cross-bar 905 of a handtruck. FIG. 18B is a view of the dual door stop holster 900 of FIG. 18A not attached to handtruck. FIG. 18C is a view of the door stop holster 900 of FIG. 18B with two door stops inside the rectangular holster 960. FIG. 18D is a side view of the dual door stop holster 900 of FIG. 18B along arrow E. Referring to FIGS. 18A–18D, dual door stop holster 900 includes an elongated rectangular box housing 960 having open ends and an open top. Interior attached bent metal tabs positioned adjacent to the open ends function as compressible springs to hold door stops 140, 141 inside box 960. A spring clip 940 has one elongated plate 942 attached by a fastener 941 such as but not limited to a weld, screw and the like, and an approximately 80 degree angled bottom plate which snapably wraps about a lower surface of a rectangular cross-brace bar 905 on a hand truck 910.

Figure 19A:
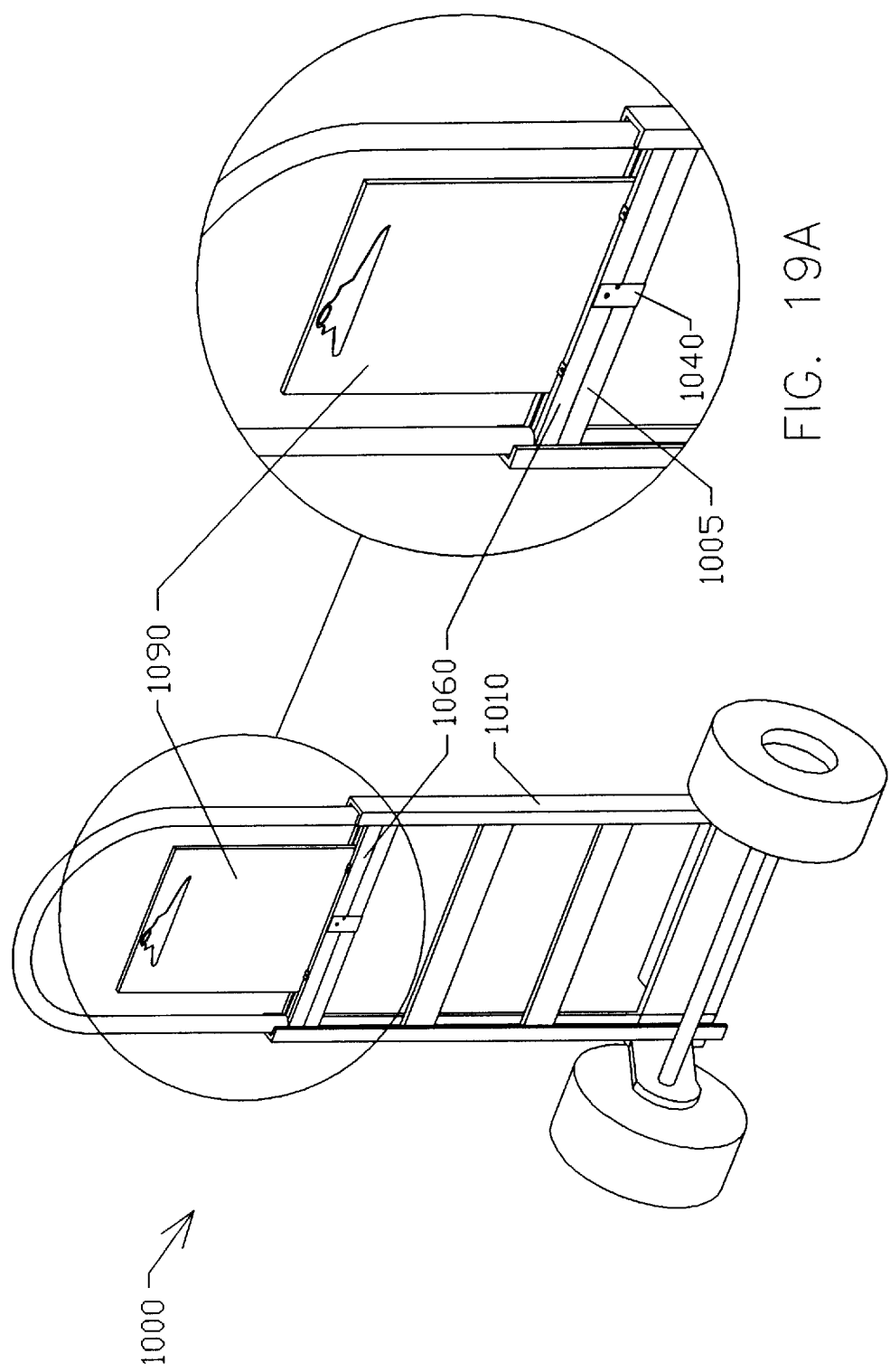
FIG. 19A is a perspective view of a clipboard holster attachment for a handtruck.

FIG. 19A is a perspective view of a clipboard holster attachment 1000 for a handtruck 1010. FIG. 19B shows the clipboard holster 1000 of FIG. 19A without a clipboard 1090 unattached to a handtruck 1010. FIG. 19C shows the clipboard holster 1000 of FIG. 19B with a clipboard 1090. FIG. 19D is a top view of the clipboard holster 1000 of FIG. 19B along arrow F.

FIG. 19E is a side view of the clipboard holster 1000 of FIG. 19B along arrow G. Referring to FIGS. 19A–19D, embodiment 1000 includes an elongated rectangular box 1060 having an opening between top portions 1062, 1066 which connect to sidewalls 1064, 1068 and bottom 1065. Interior angled bent metal tabs 1015, 1025 connected by fasteners 1016, 1026 such as rivets, bolts, welds, function as compressible springs along with rear insertion metal tab 1069 to support the lower portion of a clipboard 1090. Spring clip 1040 attached by a fastener 1041(such as those previously described) has a back plate 1042 and an approximately 80 degree angled bottom plate 1044 which snapably wraps about a lower surface of a rectangular cross-brace 1005 on a handtruck 1010.

FIG. 20A is a perspective view of another clipboard holster attachment 1100 for a handtruck 1110. FIG. 20B is a view of the clipboard holster attachment 1100 of FIG. 20A without a clipboard 1190 and unattached to a handtruck 1110. FIG. 20C is a view of the clipboard holster of FIG. 20B with a clipboard 1190. Referring to FIGS. 20A–20C, embodiment 1100 includes an elongated rectangular box 1160 having an opening between bottom portions 1163, 1165 which connect to sidewalls 1164, 1166 and a top surface 1162 having an elongated slot opening 1165 therethrough. The ends 1161, 1169 of box 1160 can fit into and mate within the interior facing grooves of side legs 1113, 1115 of handtruck 1110. Although ends 1161, 1169 are shown as having flat surfaces perpendicular to sides 1162, 1164, the ends can be concave curved if the inward facing surfaces of handtruck side legs are cylindrical and/or convex curve shaped. The rectangular box 1160 can be substituted for the existing handtruck cross-brace bar 1060 shown in FIGS. 19A–19E. A clipboard 1190 can be inserted through elongated slot opening 1165 with a bottom portion 1191 abutting against another cross-brace bar 1105 existing on a handtruck 1110.

Figure 21B:
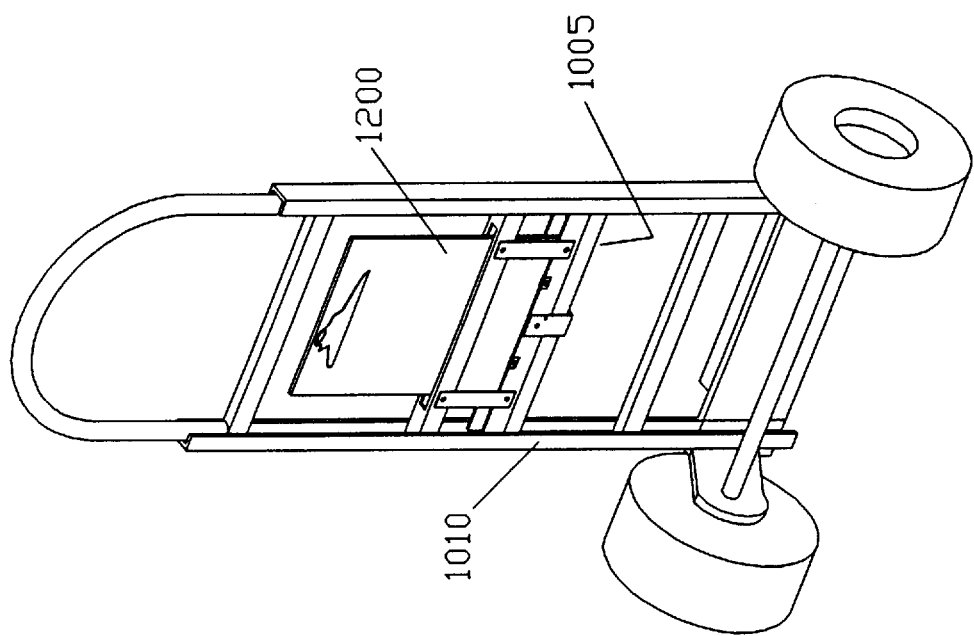
FIG. 21B is a view of the holster embodiment of FIG. 21A with a handtruck.

FIGS. 21A–21B are perspective views of another clipboard holster 1200 for use with handtruck such as the handtruck 1010 shown in FIG. 19A. Embodiment 1200 includes an upper rectangular box 1260 constructed similar to box 1160 of FIGS. 20A–20C. Box 1260 includes an opening between bottom portions 1263, 1265 which connect to sidewalls 1264, 1266 and a top surface 1262 having an elongated slot opening 1265 therethrough. Embodiment 1200 further includes a lower rectangular box 1280 which is similar to the rectangular box 1060 of FIGS. 19A–19E. Upper rectangular box 1260 can be connected to support plates 1272, 1276 by fasteners 1271, 1275 such as screws, bolts and the like. Lower box 1280 can be connected to plates 1272, 1276 by similar fasteners 1273, 1277 such as but not limited to screws, bolts and the like. Lower box 1280 of FIG. 21A has an opening between top portions 1282, 1286 which connect to sidewalls 1284, 1288 and bottom 1285. Interior angled bent metal tabs 1215, 1225(similar to those shown in FIGS. 19A–19E) function as compressible springs along with rear insertion metal tab 1217. Spring clip 1240 attached by a fastener 1241(such as those previously described) has a back plate 1242 and an approximately 80 degree angled bottom plate 1244 which snapably wraps about a lower surface of a rectangular cross-brace 1005 on a handtruck 1010 shown in FIGS. 19A–19E. The ends 1261, 1269 of box 1260 and the ends 1281, 1289 of box 1280 of FIG. 21A can fit into and mate within the interior facing grooves of side legs 1113, 1115 of handtruck 1110 shown in FIG. 20A. Although ends 1261, 1269, 1281, 1289 are shown as having surfaces perpendicular to the sidewalls of the boxes 1260, 1280, these ends can be concave curved if the inward facing surfaces of the handtruck side legs are cylindrical and/or convex curve shaped. The rectangular boxes 1260, 1280 of FIG. 21A can be substituted for the existing handtruck cross-brace bar(s) 1060 shown in FIGS. 19A–19E. A clipboard(such as 1190 of FIG. 20A) can be inserted through elongated slot opening 1265 and passed through the opening between portions 1282, 1286 to abut against the lower interior base wall 1285 of box 1280.

Figure 22:
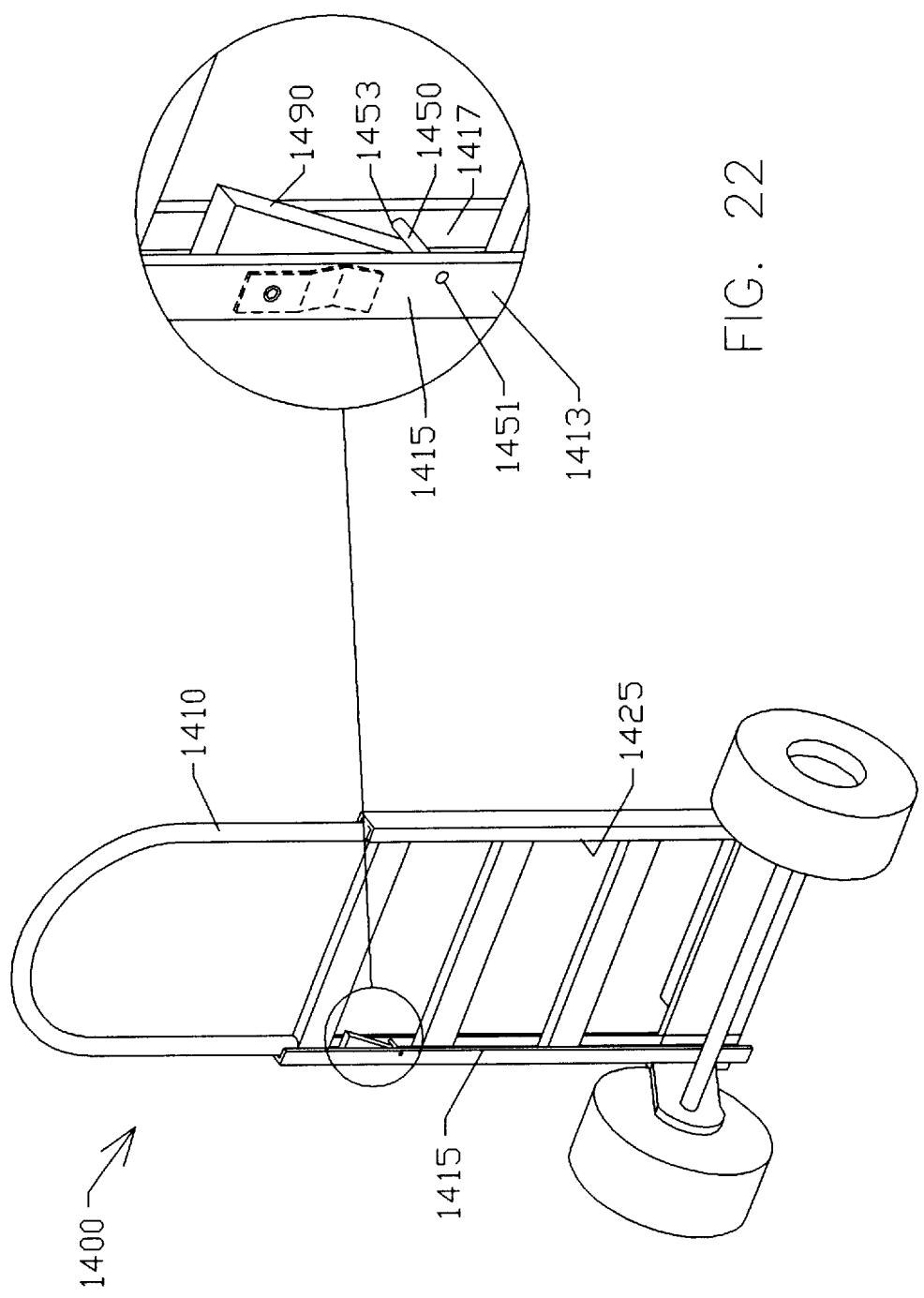
FIG. 22 is a perspective view of a doorstop holster built into the side leg frame of a handtruck.

FIG. 22 is a perspective view of a doorstop holster 1400 built into the side legs 1415, 1425 of a handtruck 1410. Handtruck 1410 has rectangular side legs 1415, 1425 having interior facing grooves therein. An interior bent metal tab spring 416(similar to 815 of FIG. 17C) can be attached to the interior surface of wall 1415 to abut and hold doorstop 1490. Embodiment 1400 includes a metal pin 1450 having ends 1451, 1453 that creates a ledge beam across the openings in the respective side legs 1415, 1425. For example ends 1451, 1453 of pin 1450 can be inserted into and fastened by welding and the like, to side walls 1413, 1417 of hollow side leg 1415. A doorstop 1490 such as a wooden door stop described previously can be inserted and supported inside the interior grooved side legs 1415, 1425 by the pin 1450.

Although a pin is shown for forming the ledge beam, other beams can be included such as but not limited to a rectangular plate beam, a square beam, a wire and the like, where the ends can be fastened by welds, screws, rivets and the like to the interior walls of the side legs 1415, 1425.

Although the preferred embodiment describes the novel collapsible door stop and novel holsters as being formed from aluminum, the invention can be formed from other materials such as but not limited to stainless steel, galvanized steel, molded plastic, fiberglass and combinations thereof.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A handtruck assembly comprising in combination:
   a handtruck having an upper handgrip end, a lower end having wheels and a base for supporting a load, vertical side legs each with a leg width and a horizontal cross-brace with a cross-brace width, between the upper handgrip end and the lower end; and
   a doorstop holster having:
      a rectangular box having a pair of first sides and a pair of second sides each being longer than each of the first sides, and an open top, each of the first sides having a length substantially similar to the leg width of the vertical side legs and the cross-brace width of the horizontal cross-brace;
   a first doorstop supported within the rectangular box; and
   a clip connected to the box for attaching the box to the horizontal cross-brace of the handtruck so that the box fits within the leg width of the vertical side legs and the cross-brace width of the horizontal cross-brace, wherein the clip allows the box to be coupled and decoupled from the horizontal cross-brace of the handtruck.

2. The handtruck assembly of claim 1, further including:
   a spring means attached to an interior side wall of the box, wherein compression of the spring means between the doorstop and the interior side wall locks the first doorstop within the box.

3. The handtruck assembly of claim 2, wherein the spring means includes:
   a bent tab.

4. The handtruck assembly of claim 1, further comprising:
   a second doorstop adapted to be positioned end to end with the first doorstop in the box.

5. The handtruck assembly of claim 4, further including:
   spring means attached to an interior side wall of the box, wherein compression of the spring means between the first doorstop and the interior side wall, and between the second doorstop and the interior side wall locks the first and the second doorstops within the box.

6. A handtruck assembly comprising in combination:
   a handtruck having an upper handgrip end, a lower end having wheels and a base for supporting a load, vertical side legs each with a leg width and a horizontal cross-brace with a cross-brace width, between the upper handgrip end and the lower end; and
   a doorstop holster having:
      a rectangular box having a pair of short sides and a pair of longer sides, and an open top, each of the short sides having a length substantially similar to the leg width of the vertical side legs and the cross-brace width of the horizontal cross-brace;
   a doorstop supported within the rectangular box; and
   a clip connected to the box for allowing the box to be supported and attached to an upper surface of the horizontal cross-brace of the handtruck so that the rectangular box fits within the leg width of the vertical side legs and the cross-brace width of the horizontal cross-brace, wherein the clip allows the box to be coupled and decoupled from the horizontal cross-brace of the handtruck.

7. The handtruck assembly of claim 6, wherein the clip further includes:
   a flat back portion and a lower upwardly angled bent hook portion, wherein the hook portion wraps about a lower surface of the horizontal cross-brace, and wherein the rectangular box and the clip together fits within the leg width of the vertical side legs and the cross-brace width of the horizontal cross-brace.

* * * * *